United States Patent [19]
Klucznik

[11] 3,862,498
[45] Jan. 28, 1975

[54] COMBINATION SINE PLATE

[76] Inventor: Arthur P. Klucznik, 28055 Adler Dr., Warren, Mich. 48093

[22] Filed: June 7, 1973

[21] Appl. No.: 367,845

[52] U.S. Cl. ............................................. 33/174 S
[51] Int. Cl. ............................................. G01b 3/30
[58] Field of Search .......... 33/174 S, 174 H, 174 E, 33/174 TC, 174 TA

[56] References Cited
UNITED STATES PATENTS
2,574,112  11/1951  Kopec................................ 33/174 S
3,148,454   9/1964  Anderson.......................... 33/185 R
FOREIGN PATENTS OR APPLICATIONS
1,100,545   9/1955  France.............................. 33/174 S

*Primary Examiner*—Samuel B. Rothberg
*Assistant Examiner*—Willis Little
*Attorney, Agent, or Firm*—Dale Austin Winnie

[57] ABSTRACT

A combination sine plate including a base plate having a work surface plate pivotally engaged thereto by a hinge pin roll between their back side edges and having two distinctly separate sine bar rolls in parallel spaced relation to each other and the hinge pin roll and respectively spaced a known Metric measurement distance from said hinge pin roll and a known U.S. standards measurement distance apart therefrom for use, respectively, with gage blocks of known Metric and U.S. standard heights.

3 Claims, 4 Drawing Figures

COMBINATION SINE PLATE

BACKGROUND OF THE INVENTION:

There is an immediate need for tooling which will enable the anticipated change from the U.S. standards form of measurement to the Metric system to be accomplished with a minimum of confusion and loss of time and materials.

This is particularly true among tool and die makers where precision is of the utmost importance and even the smallest mistake can prove very costly. And, one of the most troublesome areas in this field has been and is sure to be in the use of sine plates for obtaining precise angular measurements.

Although separate sine plates are known for use with U.S. and Metric measurements, with appropriate degree and minute angle tables, the use of distinctly separate tools for one or the other is an expense to the tool and die maker and offers no means of double checking his work which, in the course of the transition, is extremely important.

To convert a U.S. standards sine plate for Metric use would require that all gage blocks in U.S. standards of measurement be identified with comparable Metric measurements, which is not always possible without interpolation beyond the one-thousands limit commonly used in Metric tables, and would require a third sine bar constants table in view of the placement of the sine bar in accord with U.S. standards. And, it would also create a hybred tool since the 5 and 10 inch standards for U.S. sine plates exceed by 27.000 mm and 54.001 mm, respectively, the commonly known 100 mm and 200 mm Metric sine plates.

To retool the U.S. sine plates for relocation of the sine bar would be to create a Metric sine plate and be economically impractical.

Combining the two measurement systems into a common tool is therefor the most desirable but it presents decided problems in the likelihood of using the wrong gage blocks with the wrong sine bars.

It is with these problems in mind, and the goals and objectives mentioned, that the present invention has been devised through careful study, experimentation and trial in the field.

SUMMARY OF THE PRESENT INVENTION:

The present invention relates to a combination sine plate for use with either U.S. standards or Metric standards of linear measurement and appropriate sine bar constants tables.

The tool includes the familiar and recognized form of sine plate known to all tool and die makers with a base plate and an angularly adjustable work surface plate hinged at one edge thereto. However, unlike commonly known sine plates it includes two relatively spaced sine bars on the underside of the work surface plate, near its extended end with the inner bar spaced a known Metric distance from the hinge axis and the outer bar spaced a known U.S. standards distance therefrom.

Inasmuch as the standards distance for location of the U.S. sine bar is greater than the distance location for placement of the Metric sine bar, the two are relatively spaced sufficiently to avoid interference therebetween in the use of their respective gage blocks.

For minute angles, channel grooves are provided on the base plates with the channel groove for Metric gage blocks extending under the Metric sine bar but with the channel groove for the U.S. sine bar terminating short thereof and extending only to lie under the U.S. sine bar. These channel grooves may also be used in high precision tools, so designated, for all angular measurements and with one thereof narrower than the other for use with comparable gage blocks fitted for use in only one or the other thereof.

An added feature, for further distinction between the use of U.S. and Metric sine bars and gage blocks, is in the color coding of one system for clearer visual discernment.

These and other objects and advantages will be clearer in the detailed description which follows of a working embodiment of the invention.

Figure 1:
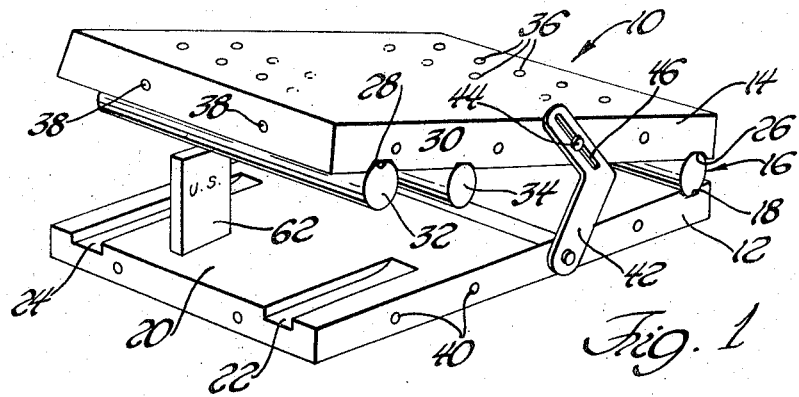
FIG. 1 is a perspective view of the combination sine plate of this invention.
Figure 2:
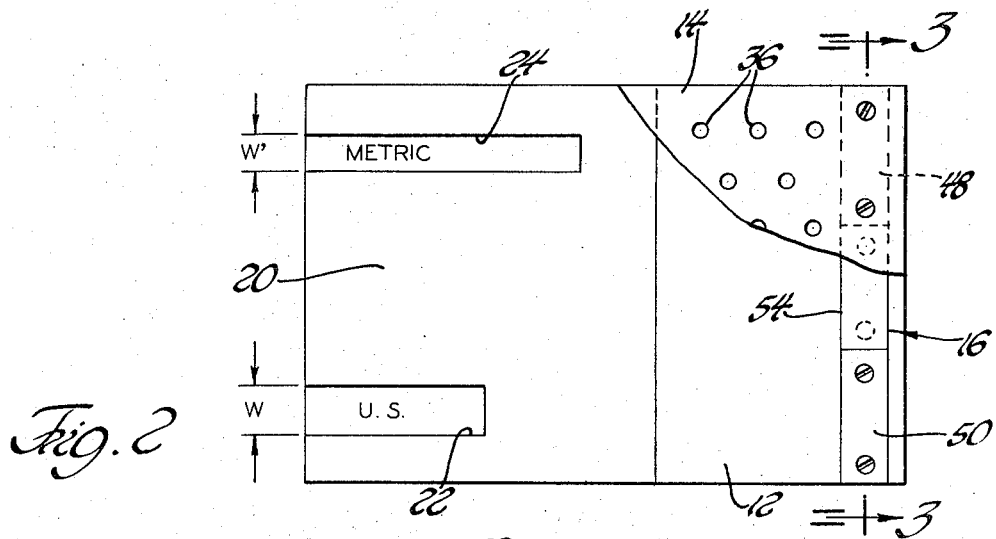
FIG. 2 is a top plan view of the combination sine plate as closed with only a fragmentary corner of the work surface plate shown.

DETAILED DESCRIPTION OF ILLUSTRATED EMBODIMENT:

The sine plate 10 shown in the drawing figures includes base plate 12 and a work surface plate 14 which are both 8 inches × 12 inches, in this particular embodiment, with side edges and surfaces parallel to within close tolerances of 0.0003 inch, and with their back side edges having a hinge connection 16 therebetween.

The base plate 12 includes a channel groove 18 clear across its back side edge for the hinge connection 16 and it has about two-thirds of its upper face, as at 20, stepped to the same depth as the channel groove. It also has two distinctly separate channel grooves or depressions 22 and 24 of a specifically known depth which extend from its front edge rearwardly near its opposite side edges.

The work surface plate 14 includes a channel groove 26 which extends across its back side edge, on its underside surface, complementary to and with the channel groove 18 in the base plate, for like use with the hinge connection 16. It also has two identically similar channel grooves 28 and 30 provided thereacross, on its underside surface, to the same depth and a specifically known and predetermined center distance from the channel groove 26, for the hinge connection, for the U.S. measurement sine bar roll 32 and the Metric measurement sine bar roll 34, respectively. The two sine bar rolls are fastened and retained in their respective channel grooves by screw fasteners, not shown, from their underside and up into the underside of the work surface plate in a manner similar to that used in fixing the hinge connection parts to the respective base and work surface plates, as will be subsequently described.

The upper face of the work surface plate 14 will be noted as including a plurality of regularly spaced holes 36, which in this instance include 5/16 inch tapped holes, that may be selectively used for clamps and other means of retaining a work piece (not shown) on the work surface plate. There are also like tapped holes 38 on the side walls of the work surface plate, and 40 on the side walls of the base plate 12, for clamps, end wall straps and the like as needed and/or desired. And, two locking straps 42 are used (only one of which is shown) on opposite sides of the two plates 12 and 14 to rigidly hold the angle settings once obtained, as by setting the adjustment screw 44 in the enlongaged slot 46 in the one arm thereof.

Figure 3:
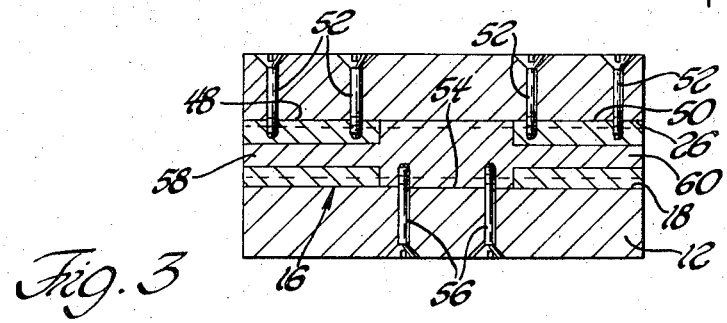
FIG. 3 is a cross sectional view through the hinge connection roll bar as seen in the plane of line 3—3 in the second drawing figure and looking in the direction of the arrows.

Referring now to the hinge connection 16, and more particularly to FIG. 3, it will be noted that the hinge connection between the base plate 12 and work surface plate 14 includes a pair of journal bearing members 48 and 50, which are retained within the channel groove 26 of the work surface plate, within respectively opposite ends thereof, by screw fasteners 52, and that a hinge pin roll member 54 is retained in the channel groove 18 of the base plate, by like screw fasteners 56, with its opposite hinge pin ends 58 and 60 received in the two journal bearing members outboard thereof. The OD dimensional size of the center section of the hinge pin member and of the journal bearing members will be appreciated as being precisely identical and that the next adjacent and outer ends of the journal bearing members are squared for flush fitting end engagement with the shoulder wall on the hinge pin and side walls of the base and work surface plates.

It will also be noted and appreciated that the OD dimensional size of the hinge pin roll parts and of the two sine bar rolls 32 and 34 are identically the same and that the respective channel grooves 18, 26, 28 and 30 and the depth to which the front upper surface 20 of the base plate is stepped are identically similar so that the two plates when closed together will be parallel within the closest possible tolerances.

For angular settings of the work surface plate 14, relative to the base plate 12, it is normal practice to use a gage or commonly called jo-block 62 in the manner shown in the first drawing figure between the base plate and one of the sine bar rolls 32 or 34, depending upon whether the jo-block is dimensioned for U.S. or Metric measurement. And, in those instances where very small minute sine angles are required, the jo-blocks are used within one of the two channel grooves 22 or 24, which will be noted respectively marked for U.S. or Metric measurement.

Figure 4:
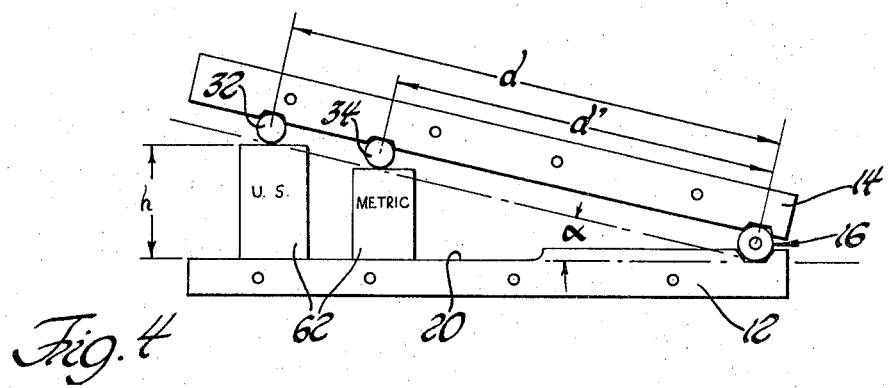
FIG. 4 is a side plan view of the combination sine plate as opened and shown in use with U.S. measurement and Metric measurement gage blocks.

Referring to FIG. 4, it will be appreciated that the sine plate 10 provides a right triangle arrangement wherein the base side is provided on the base plate 12, the right angle side or altitude is provided by the jo-blocks 62, and the hypotenuse is the dimensional distance between the centers of the hinge and sine bar rolls. Since the dimensional distance between the sine bar roll 32 for U.S. measurements and the hinge bar roll is a known constant, identified as d and being 10.000 inches in this particular illustrated embodiment, it follows that by the use of a U.S. measurement jo-block of a selected height, identified as h, a known sine angle dimension and is readily obtainable. Similarly, since the Metric measurement sine bar roll 34 is a known distance d', in this instance 200 mm., from the hinge bar roll, a Metric measurement jo-block of a known height will also provide a sine angle of known degree.

The advantage gained in having the U.S. and Metric measurements useable on a common sine plate is that one sine plate will serve for either use and that in the conversion from one measurement system to the other there is a cross check readily available of the one against the other.

To minimize the chance for mistake or confusion, the U.S. measurement blocks and the Metric measurement blocks are specifically marked as "U.S." or "Metric." And, like markings are used in the channel grooves 22 and 24 for measuring the minute angles, as well as in having the Metric channel groove of greater length, to extend under the Metric sine bar roll, while the other channel groove terminates short thereof and is only relatively under the U.S. measurement sine bar roll.

A still further refinement, and safeguard against misuse of U.S. or Metric jo-blocks under the wrong sine bar rolls, may be provided in having special sets of U.S. and Metric jo-blocks intended to be used within the minute angle channel grooves 22 and 24, and consequently inclusive of their depth dimension, and with each set of a different dimensional thickness which is both perceptable to the fingers of a well trained tool and die man and which will only fit properly in its own channel groove; noted as of varying widths $w$ and $w'$ to emphasize this feature in the second drawing figure.

A still further means of more clearly distinguishing the U.S. and Metric system sine bars and gage blocks may be obtained in having one set or the other color coded or otherwise more distinctly marked. In the illustrated embodiment this is accomplished by the "U.S." and "Metric" marking on the respective gage blocks but is considered unnecessary as regards the sine bar ends in view of the known fixed location of the Metric bar relatively behind the U.S. bar.

I claim:

1. A sine plate for obtaining precise angular measurements in degrees and minutes with the use of standard U.S. and Metric measurement gage blocks, and comprising; squared and parallel base and work-surface plate members pivotally hinged together near their back side edges for angular placement of said work-surface plate member relative to said base plate member, a hinge pin roll pivotally connecting together said base and work-surface plate members, and a pair of sine bar roll members of identically like cross-sectional size to each other and said hinge pin roll provided on the underside of said work-surface plate member in parallel squared relation to each other and apart from said hinge pin roll, a gage block receptive surface provided on said base plate member and receptive of said sine bar roll members each together in touching engagement therewith in the parallel orientation of said work-surface plate member relatively over said base plate member, said sine bar roll members being respectively disposed a precisely known U.S. standard and Metric standard distance apart from said hinge pin roll for respective use of U.S. and Metric measurement gage blocks therewith, and including distinctly separate channel grooves provided transversely of said sine bar members, near relatively opposite ends thereof and within said base plate members, and of respectively known U.S. and Metric measurement depths for use with respective of said sine bar members.

2. The sine plate of claim 1, said channel grooves being provided within the gage block receptive surface of said base plate member from the front edge thereof rearwardly for use with and to lie relatively under said sine bar members.

3. The sine plate of claim 2, said channel grooves having only the channel groove of known metic measurement depth extended sufficiently rearwardly for use with the metric measurement sine bar.

* * * * *